United States Patent
Kambara

(10) Patent No.: US 7,352,136 B2
(45) Date of Patent: Apr. 1, 2008

(54) DC-DC CONVERTER WITH REDUCED SURGE VOLTAGE AND AN ELECTRONIC BALLAST INCLUDING THE CONVERTER FOR A DISCHARGE LAMP

(75) Inventor: Takashi Kambara, Ikeda (JP)

(73) Assignee: Matsushita Electric Works, Ltd., Osaka (JP)

( * ) Notice: Subject to any disclaimer, the term of this patent is extended or adjusted under 35 U.S.C. 154(b) by 380 days.

(21) Appl. No.: 10/548,673

(22) PCT Filed: Mar. 2, 2004

(86) PCT No.: PCT/JP2004/002577

§ 371 (c)(1),
(2), (4) Date: Sep. 8, 2005

(87) PCT Pub. No.: WO2004/082113

PCT Pub. Date: Sep. 23, 2004

(65) Prior Publication Data

US 2006/0170374 A1 Aug. 3, 2006

(30) Foreign Application Priority Data

Mar. 12, 2003 (JP) .............................. 2003-067301

(51) Int. Cl.
*H05B 37/02* (2006.01)

(52) U.S. Cl. ....................... 315/291; 315/289; 315/279; 315/283; 315/DIG. 5; 363/56.12; 363/56.1; 363/91

(58) Field of Classification Search ............ 315/209 R, 315/291, 247, 244, 274, 279, 276, 282, 283, 315/307, 289, 290, DIG. 5; 363/21.02, 21.04, 363/56.1, 91, 56.11, 56.12

See application file for complete search history.

(56) References Cited

U.S. PATENT DOCUMENTS 4,415,959 A * 11/1983 Vinciarelli ................ 363/21.04

(Continued)

FOREIGN PATENT DOCUMENTS

JP 2-106165 4/1990

(Continued)

OTHER PUBLICATIONS

English Language Abstract of JP 8-140345.

(Continued)

*Primary Examiner*—Haissa Philogene
(74) *Attorney, Agent, or Firm*—Greenblum & Bernstein, P.L.C.

(57) ABSTRACT

A DC-DC converter reduces a surge voltage developed across a switching element (30) in making the voltage conversion with the use of a transformer (20) inherently having considerable leakage. A snubber circuit is included to absorb the surge energy and transferring it to a load, or output end of the converter, reducing the surge voltage across the switching element (30). A snubber capacitor (51) is provided to absorb the surge energy developed by the transformer (20) when the switching element (30) is off. Thus absorbed energy is collected in a storage capacitor (53) through a reactor (54) while the switching element (30) is on and off, and is then transferred from the storage capacitor (53) to the load, i.e., the output side of the converter, leaving only a minimum voltage being applied across the switching element (30).

4 Claims, 4 Drawing Sheets

U.S. PATENT DOCUMENTS

| | | | |
|---|---|---|---|
| 5,088,017 A * | 2/1992 | Yaginuma et al. | 363/21.04 |
| 5,278,748 A * | 1/1994 | Kitajima | 363/21.02 |
| 6,744,222 B2 * | 6/2004 | Kisaichi et al. | 315/291 |
| 7,254,046 B2 * | 8/2007 | Kawasaki et al. | 363/21.12 |
| 2003/0002300 A1 | 1/2003 | Nakamura | |

FOREIGN PATENT DOCUMENTS

| | | |
|---|---|---|
| JP | 8-140345 | 5/1996 |
| JP | 2002-101657 | 4/2002 |
| WO | 02/41481 | 5/2002 |

OTHER PUBLICATIONS

English Language Abstract of JP 2002-101657.
English Language Abstract of JP 2-106165.

* cited by examiner

DC-DC CONVERTER WITH REDUCED SURGE VOLTAGE AND AN ELECTRONIC BALLAST INCLUDING THE CONVERTER FOR A DISCHARGE LAMP

TECHNICAL FIELD

The present invention is directed to a DC-DC converter with reduced surge voltage, and more particularly, a positive to negative DC converter, and an electronic ballast including the converter for operating the lamp or load.

BACKGROUND ART

JP02-106165 and JP2002-101657 disclose a DC-DC converter having a switching element which is driven to interrupt an input DC voltage for providing a regulated DC voltage to a load. The converter is equipped with a snubber circuit for reducing a surge voltage developed across the switching element. The snubber circuit is arranged to absorb the surge energy to be applied across the switching element and returning to the input DC voltage source in an attempt to reduce the surge voltage across the switching element for protection of the switching element as well as to reuse the energy for the load.

This scheme, however, is found to be insufficient for effectively feeding back the surge energy to the load and therefore not satisfactory for reducing the surge voltage being applied to the switching element, particularly when the converter is required to give a high output power to the load.

DISCLOSURE OF THE INVENTION

The present invention has been accomplished in view of the above insufficiency to provide an improved DC-DC converter which is capable of greatly reducing the surge voltage and effectively transferring the input DC energy to the load. The DC-DC converter of the present invention includes a transformer having a primary winding and a secondary winding, and a switching element connected in series with the primary winding across a DC voltage source. The switching element is driven to turn on and off for repetitively interrupting a current flowing through the primary winding to induce a voltage across the secondary winding. A rectifier diode is connected in series with the secondary winding across the load to apply the induced voltage to the load as an output DC voltage which is negative with respect to a circuit ground. A snubber capacitor is included to be connected in series with a snubber diode across the switching element to be charged by current flowing through the primary winding when the switching element is off. The converter further includes a storage capacitor which is connected in series with a reactor across the switching element in parallel with the snubber diode so as to be charged by a current from the snubber capacitor through the reactor when the switching element is on and off. Also included in the converter is a replenishing diode which is connected in series with the load across the storage capacitor to allow the storage capacitor to discharge for providing an additional power to the load. Thus, the surge energy can be recovered in the snubber capacitor and then accumulated in the storage capacitor so as to be transferred to the load.

In a preferred embodiment, the converter includes a smoothing capacitor which is connected across the series combination of the secondary winding and the rectifier diode in parallel relation with the load in order to smooth the DC voltage developed at the secondary winding and rectified through the rectifier diode for providing the smoothed DC voltage to the load. The replenishing diode is connected in series with the smoothing capacitor across the storage capacitor for charging the smoothing capacitor by a voltage accumulated at the storage capacitor.

An electronic ballast for a discharge lamp in accordance with the present invention includes the DC-DC converter of the above configuration and an ignitor providing a high breakdown voltage to the lamp for igniting the lamp. The DC-DC converter additionally includes a start-assisting circuit for supplying a sufficient amount of current to the lamp immediately after the lamp is ignited for starting the lamp successfully. The start-assisting circuit is arranged to have a series combination of a capacitor and a resistor connected across the storage capacitor in parallel relation with a series combination of the replenishing diode and the load. Thus, the capacitor can be charged by the surge energy and act to supply the current through the resistor to the lamp for successfully starting the lamp.

The present invention also provides an electronic ballast of another type having the DC-DC-converter of the above configuration and a DC-AC converter for supplying an AC output power to operate the discharge lamp. The DC-DC converter converts the input DC voltage into the output DC voltage, and includes a smoothing capacitor for storing the output DC voltage. The DC-AC converter converts the output DC voltage to give the AC output power, and is configured to have four IGBT transistors arranged in a full-bridge configuration. The use of the IGBT transistors can reduce a voltage difference or loss between the lamp voltage and the output DC voltage of the DC-DC converter. Accordingly, for operating the lamp requiring a relatively high voltage, the DC-DC converter can be designed to give a moderate output voltage exceeding the high lamp voltage only by a small extent, and therefore can make the use of the above effect of transferring the surge energy to the output with attendant decrease of the energy loss.

These and still other advantageous features of the present invention will be more apparent from the detailed description of preferred embodiments of the present invention when taking in conjunction with the attached drawings.

BEST MODE FOR CARRYING OUT THE INVENTION

Figure 1:
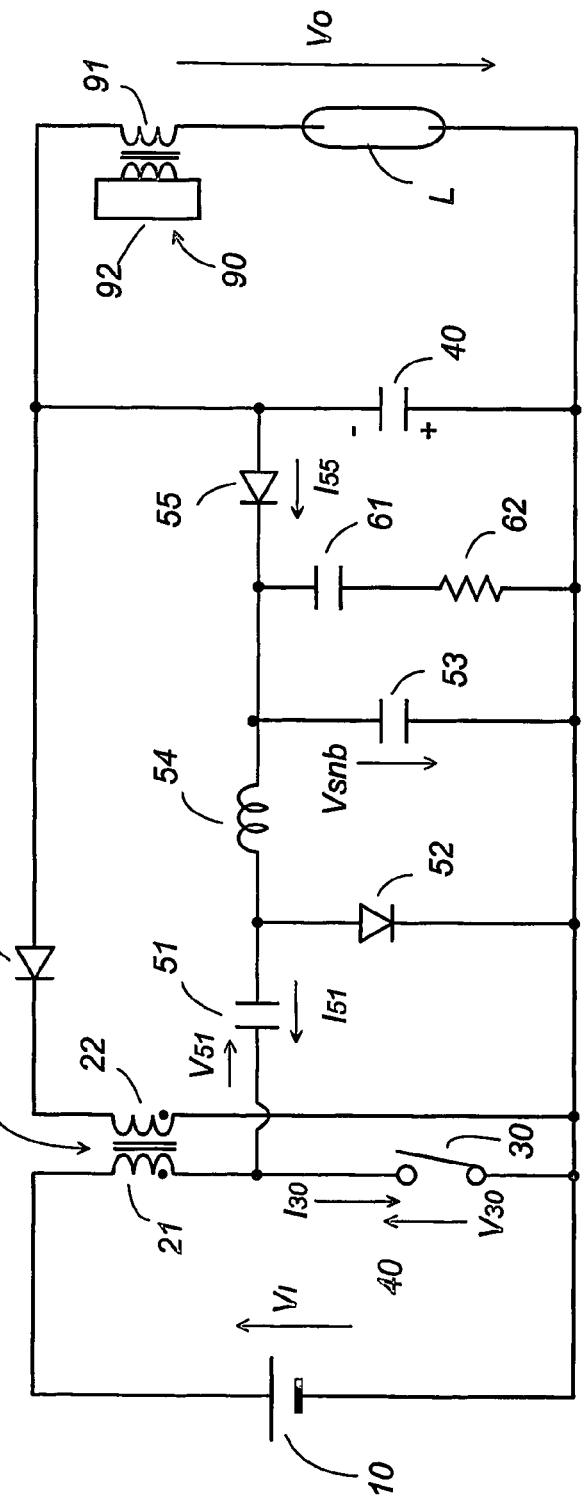
FIG. 1 is a circuit diagram of a DC-DC converter in accordance with a first embodiment of the present invention.

Now referring to FIG. 1, there is shown a DC-DC converter in accordance with a preferred embodiment of the present invention. In the illustrated embodiment, the DC-DC converter is utilized for operating a high intensity discharge lamp such as a metal halide lamp for automobile's head lamp, although the present invention should not be interpreted to be limited thereto. The DC-DC converter converts an input DC voltage from a DC voltage source 10, for example, a car battery into a high output DC voltage that is applied to the lamp. The converter includes a transformer 20 having a primary winding 21 and a secondary winding 22. A switching element 30 is connected in series with the primary winding 21 across the DC voltage source 10 and is driven to turn on and off at a high frequency for repetitively interrupt a current from the DC voltage source for storing energy in the transformer 20. The secondary winding 22 is connected in series with a rectifier diode 24 across a smoothing capacitor 40 to release the energy for charging the smoothing capacitor 40 each time the switching element 30 is turned off, developing a rectified and smoothed DC voltage across the smoothing capacitor 40 as the output DC voltage. The output DC voltage can be regulated by varying the duty of the switching element 30. The lamp L is connected in series with an ignitor 90 across the smoothing capacitor 40 to be supplied with the DC voltage. The ignitor 90 includes a pulse transformer 91 and a driver 92 for generating a high breakdown voltage to ignite the lamp L from the output DC voltage of the converter. The winding sense of the transformer 20 is selected to generate the output DC voltage which is negative with respect to the circuit ground.

The converter includes a snubber circuit for absorbing surge energy developed in the transformer 20 and acting to give a corresponding surge voltage across the switching element 30. The snubber circuit includes a snubber capacitor 51 connected in series with a snubber diode 52 across the switching element 30, a storage capacitor 53 connected in series with a reactor 54 across the switching element 30 in parallel with the snubber diode 52, and a replenishing diode 55 connected in series with the smoothing capacitor 40 across the storage capacitor 53.

Further, the converter includes a start-assisting circuit composed of a capacitor 61 and a resistor 62 which are connected in series across said storage capacitor 53 for providing a starting current to the lamp L for starting the lamp immediately after the lamp is ignited, details of which will be explained hereinafter.

Prior to explaining the operation of the converter, it is noted that the transformer 20 brings about a surge voltage to be applied across the switching element 30 and that the transformer has inevitable leakage which gives the surge voltage considerably higher than the output DC voltage Vo. The snubber circuit is included in the converter to reduce the surge voltage by transferring the surge energy into the smoothing capacitor 40 or the lamp L, thereby allowing the use of the switching element having lowered withstand voltage for efficient and compact circuit design. When an excessive surge voltage is to be applied across the switching element 30 when it is off, the corresponding surge energy is recovered into the snubber capacitor 51 through the snubber diode 52. The recovered surge energy is then transferred into the storage capacitor 53 through the reactor 54 and the switching element 30 when it is on, and through the primary winding 21, the DC voltage source 10, and the reactor 54 when the switching element 30 is off. Thus, the storage capacitor 53 is charged to develop a voltage Vsnb. When the output DC voltage Vo is lowered below the voltage Vsnb, the storage capacitor 53 acts to charge the smoothing capacitor 40 through the replenishing diode 55 for replenishing the smoothing capacitor 40 or the lamp with extra energy. Thus, the surge energy can be absorbed and transferred into the output DC voltage being applied to the lamp L. With this result, the storage capacitor 53 can maintain its voltage Vsnb which is nearly equal to the output DC voltage Vo, thereby leaving the switching element 30 to be exposed only to a low voltage that is nearly equal to the output DC voltage Vo plus the input DC voltage VI, and is lower than the surge voltage otherwise developed across the switching element in the absence of the snubber circuit. In other words, voltage V30 appearing across the switching element 30 is deemed to be voltage V51 across capacitor 51 which is nearly equal to the sum of output voltage Vo ($\approx$Vsnb) and input voltage VI, and is expressed as V30 ($\approx$V51)$\approx$Vo+VI.

Figure 2:
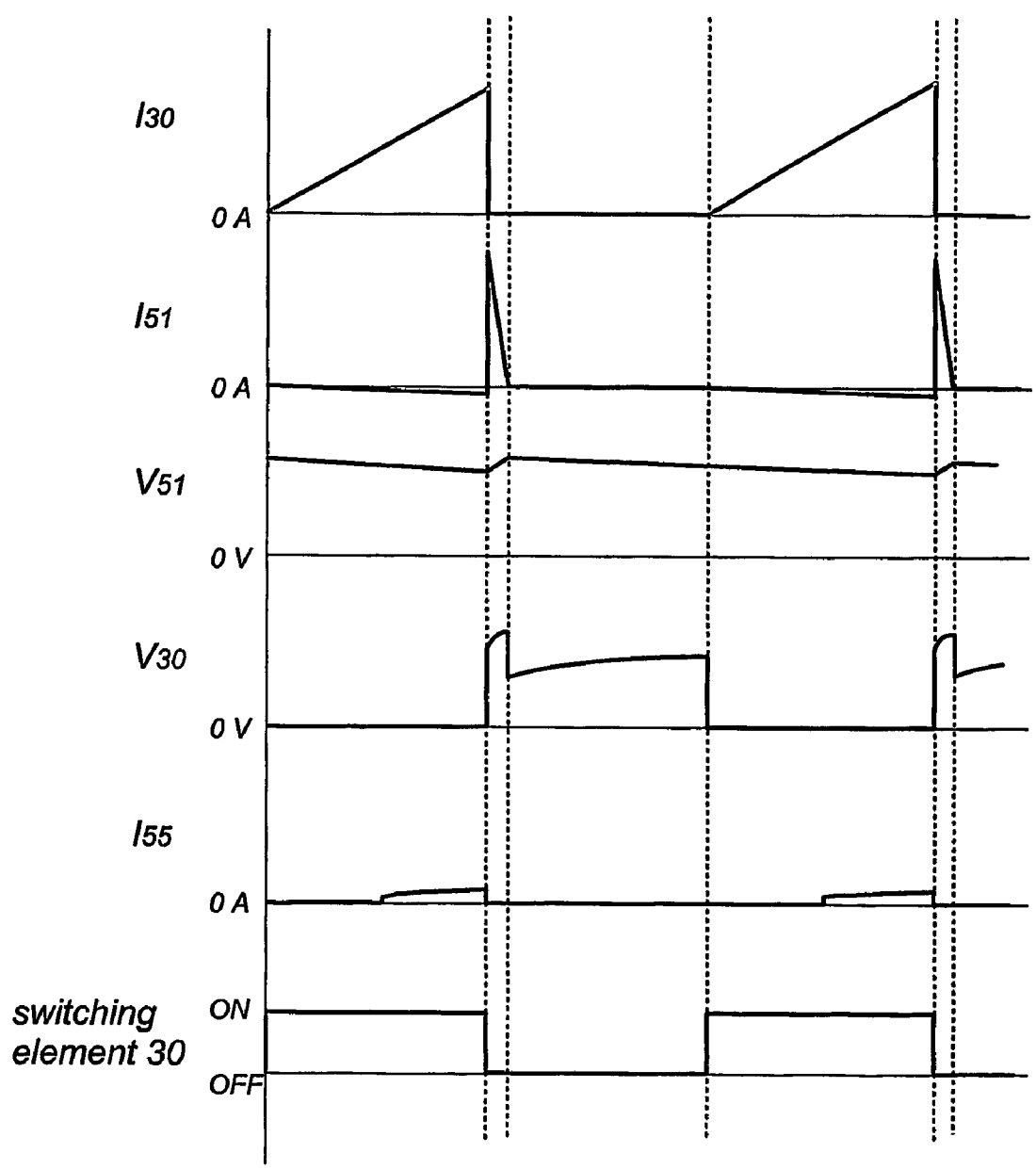
FIGS. 2 and 3 are waveform charts respectively illustrating the operation of the above converter.
Figure 3:
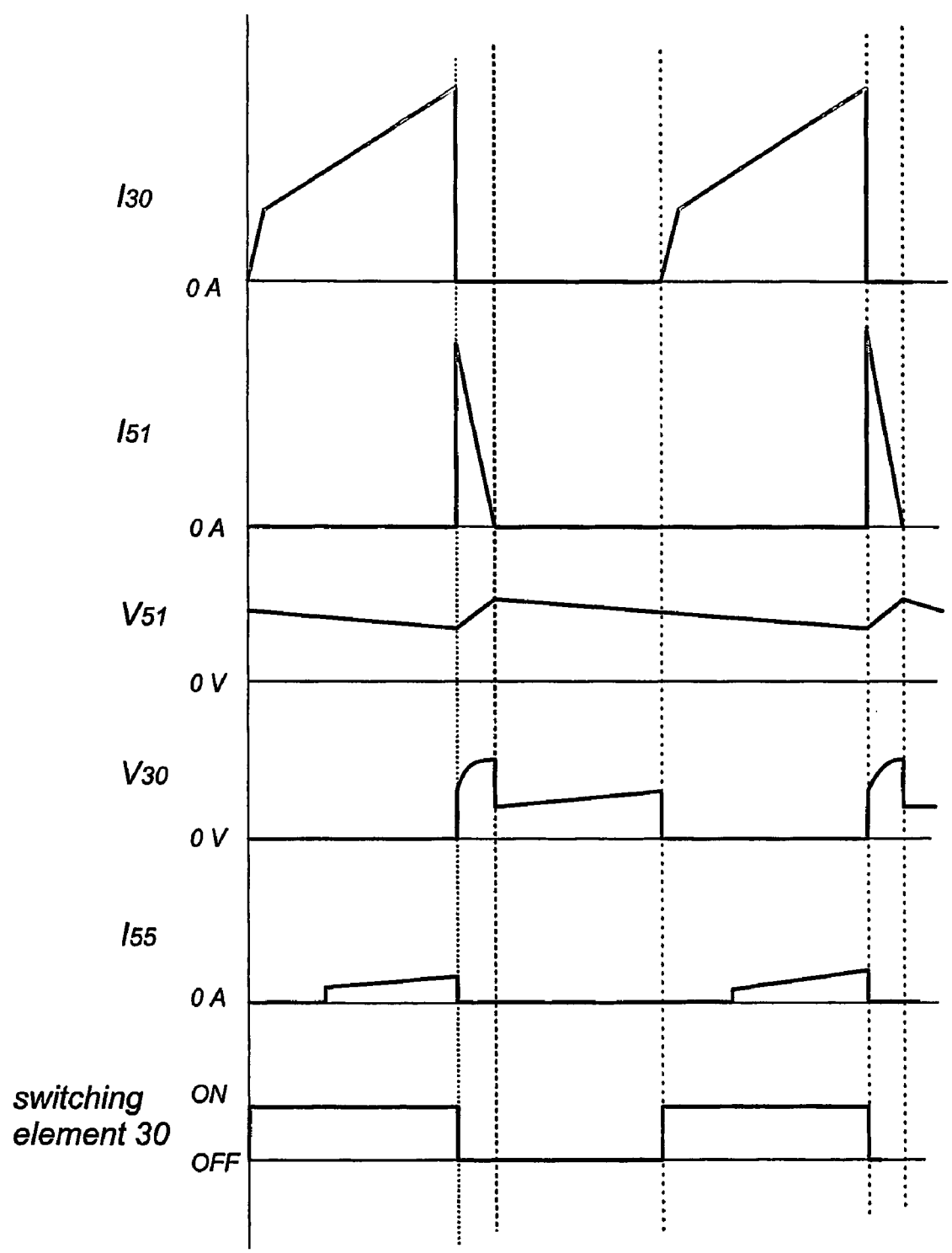

FIG. 2 shows waveforms of currents and voltages appearing in the circuit when the converter provides a relatively low output power, for example 35 Watts, for operating the low power lamp, while FIG. 3 shown the same when the converter provides a relatively high output power, for example, 110 Watts for operating the high power lamp. In both cases, voltage V51 (V30) can be kept at a relatively low level, which demonstrates that the surge energy is well absorbed and transferred into the output power. As particularly seen from the figures, the effect of absorbing and transferring the surge energy is prominent when the converter operates to provide a high output power to the lamp or the load. This is because of that the surge energy due to the leakage of the transformer will increase progressively in proportion to the square of the current flowing through the transformer. Thus, the converter of the present invention can be particularly advantageous for operating the lamp of high power rating, such as mercury-free metal halide lamp.

Figure 4:
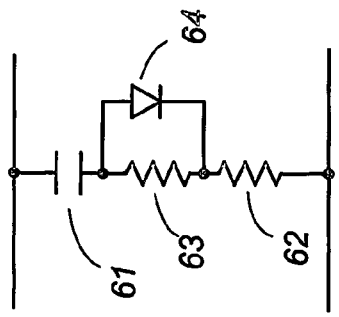
FIG. 4 is a partial circuit diagram showing a modified start-assisting circuitry that may be utilized in the above converter.

When starting the lamp, the converter is firstly controlled by varying the duty of the switching element 30 to provide a relatively high output voltage, for example, 400 V, across the smoothing capacitor 40, enabling the ignitor 90 to ignite the lamp. Then, the converter is controlled to provide a relatively high output voltage for a short time period, allowing the capacitor 61 of the start-assisting circuit to supply a starting current to the lamp for successfully and rapidly operate the lamp, after which the converter is controlled to lower the output voltage to a rated lamp voltage for maintaining the lamp being operated. During the transient period before the output voltage is lowered to the rated lamp voltage, capacitor 53 and capacitor 61 are charged with a delay in relation to smoothing capacitor 40 due to the combination effect of capacitors 61, 53, 51, reactor 54, and primary winding 21. With this result, capacitor 61 can be free from the high output voltage instantaneously generated to ignite and start the lamp L rapidly, and therefore can be made to withstand only the low voltage, for example, 120V. Thus, the capacitor 61 of the start-assisting circuit can be selected from those of the low withstand voltage having reliable impedance characteristic, which contributes to a compact design of the converter. The start-assisting circuit may be modified, as shown in FIG. 4, to have a parallel combination of resistor 63 and diode 64 between capacitor 61 and resistor 62.

Figure 5:
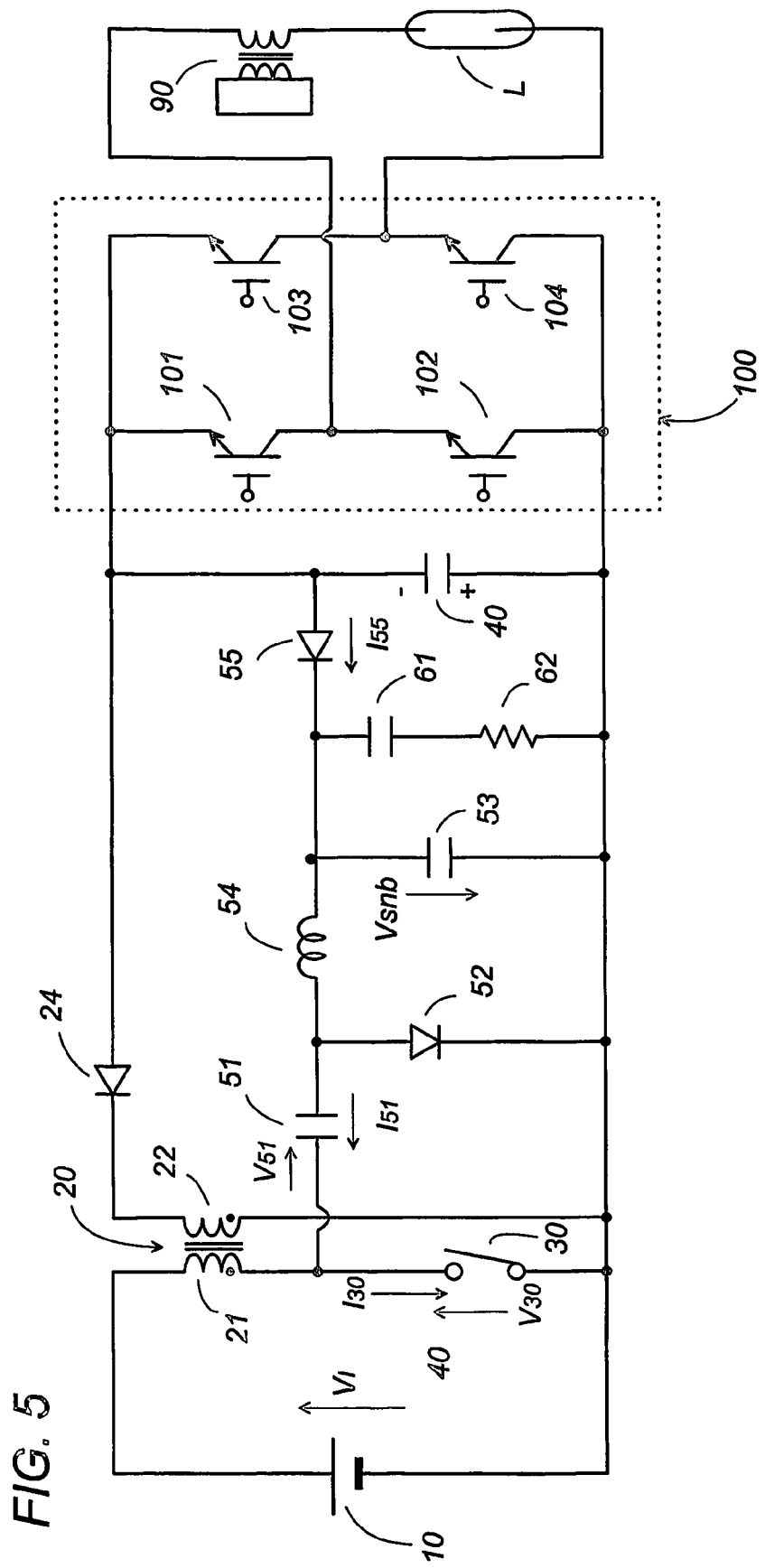
FIG. 5 is a circuit diagram of an electronic ballast in accordance with another embodiment of the present invention.

FIG. 5 shows an electronic ballast in accordance with another preferred embodiment of the present invention. The ballast is designed to operate a high intensity discharge lamp L on AC power, and is composed of the DC-DC converter and a DC-AC converter 100. The DC-DC converter is identical to that disclosed in the previous embodiment. Therefore, no duplicate explanation is deemed necessary, but identical reference numerals are indicated in FIG. 5 for easy reference purpose. The DC-AC converter is made of four IGBTs (Insulated Gate Bipolar Transistor) 101 to 104 arranged in a full-bridge configuration to convert the output DC voltage of the converter into an AC voltage for operating the lamp L. By taking the advantage of that IGBT requires only a low voltage drop, the DC-AC converter 100 can reduce a voltage difference between the load voltage being applied to the lamp and the output voltage of the DC-DC converter, which in turn requires the DC-DC converter to provide the output voltage higher by a small extent than the load voltage, and therefore makes the best use of the snubber circuit of absorbing the surge energy for protection of the switching element 30.

The invention claimed is:

1. A DC-DC converter for providing an output DC voltage to a load, said converter comprising:
   a transformer having a primary winding and a secondary winding;
   a switching element connected in series with said primary winding across a DC voltage source, said switching element being driven to turn on and off for repetitively interrupting a current flowing through said primary winding to induce a voltage across said secondary winding;
   a rectifier diode connected in series with said secondary winding across said load to apply said induced voltage to said load as an output DC voltage which is negative with respect to a circuit ground;
   a snubber capacitor connected in series with a snubber diode across said switching element to be charged by current flowing through said primary winding when said switching element is off;
   a storage capacitor connected in series with a reactor across said switching element in parallel with said snubber diode to be charged by a current from said snubber capacitor through said reactor when said switching element is on and off,
   a replenishing diode connected in series with said load across said storage capacitor to allow said storage capacitor to discharge for providing an additional power to said load.

2. The converter as set forth in claim 1, further including a smoothing capacitor which is connected across the series combination of said secondary winding and said rectifier diode in parallel relation with said load,
   said replenishing diode being connected in series with said smoothing capacitor across said storage capacitor for charging said smoothing capacitor by a voltage accumulated at said storage capacitor.

3. An electronic ballast for a high intensity discharge lamp, said ballast comprising:
   a DC-DC converter for providing a DC voltage to said lamp; and
   an ignitor providing a high breakdown voltage to said lamp for igniting said lamp,
   said converter comprising:
      a transformer having a primary winding and a secondary winding;
      a switching element connected in series with said primary winding across a DC voltage source, said switching element being driven to turn on and off for alternately interrupting a current flowing through said primary winding to induce a voltage across said secondary winding;
      a rectifier diode connected in series with said secondary winding across said lamp to apply said induced voltage to said lamp as an output DC voltage which is negative with respect to a circuit ground;
      a snubber capacitor connected in series with a snubber diode across said switching element to be charged by current flowing through said primary winding when said switching element is off;
      a storage capacitor connected in series with a reactor across said switching element in parallel with said snubber diode to be charged by a current from said snubber capacitor through said reactor when said switching element is on and off,
      a replenishing diode connected in series with said lamp across said storage capacitor to allow said storage capacitor to discharge for providing an additional power to said lamp,
   wherein said converter includes
   a start-assisting circuit that comprises a series combination of a capacitor and a resistor connected across said storage capacitor in parallel relation with a series combination of said replenishing diode and said lamp.

4. An electronic ballast for a high intensity discharge lamp, said ballast comprising:
   a DC-DC converter for converting an input DC voltage into an output DC voltage;
   a DC-AC converter for converting said DC voltage into an AC output power to be supplied to said discharge lamp,
   said DC-DC converter comprising:
      a transformer having a primary winding and a secondary winding;
      a switching element connected in series with said primary winding across a DC voltage source, said switching element being driven to turn on and off for repetitively interrupting a current flowing through said primary winding to induce a voltage across said secondary winding;
      a smoothing capacitor connected across said secondary winding, a rectifier diode connected in series with said secondary winding across said smoothing capacitor to store said induced voltage to smoothing capacitor as said output DC voltage which is negative with respect to a circuit ground;
      a snubber capacitor connected in series with a snubber diode across said switching element to be charged by current flowing through said primary winding when said switching element is off;
      a storage capacitor connected in series with a reactor across said switching element in parallel with said snubber diode to be charged by a current from said snubber capacitor through said reactor when said switching element is on and off,
      a replenishing diode connected in series with said smoothing capacitor across said storage capacitor to allow said storage capacitor to discharge for providing an additional power to said smoothing capacitor,
   said DC-AC converter comprising four IGBT transistors arranged in a full-bridge configuration.

* * * * *